(12) United States Patent
Cummings

(10) Patent No.: US 10,390,240 B2
(45) Date of Patent: *Aug. 20, 2019

(54) MOBILE DEVICE VALIDATION

(71) Applicant: T-Mobile USA, Inc., Bellevue, WA (US)

(72) Inventor: Oscar Cummings, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/009,150

(22) Filed: Jun. 14, 2018

(65) Prior Publication Data

US 2018/0295530 A1    Oct. 11, 2018

Related U.S. Application Data

(63) Continuation of application No. 15/660,908, filed on Jul. 26, 2017, now Pat. No. 10,021,580, which is a
(Continued)

(51) Int. Cl.
*H04L 12/26* (2006.01)
*H04W 24/06* (2009.01)
(Continued)

(52) U.S. Cl.
CPC .......... *H04W 24/06* (2013.01); *H04L 43/045* (2013.01); *H04L 43/0823* (2013.01);
(Continued)

(58) Field of Classification Search
CPC ................................................... H04W 24/06
See application file for complete search history.

(56) References Cited

U.S. PATENT DOCUMENTS 8,818,354 B1    8/2014   Bennett et al.
8,880,056 B2    11/2014  King
(Continued)

FOREIGN PATENT DOCUMENTS

CA    2715761 A1    3/2011
EP    2031918 A2    3/2009
(Continued)

OTHER PUBLICATIONS

International Searching Authority, International Search Report and Written Opinion, PCT Patent Application PCT/US2017/023467, dated Jun. 22, 2017, 13 pages.
(Continued)

*Primary Examiner* — Diane D Mizrahi
(74) *Attorney, Agent, or Firm* — Perkins Coie LLP

(57) ABSTRACT

The disclosure relates to technology for managing signal distribution and lab resources in design validation environments that replicate a type of communication signal a consumer can experience on a wireless provider's network. For example, the validation environment will enable engineers to test VoLTE in an LTE for various smart phone designs and other network-based signals from various hardware combinations and suppliers. Additionally, various embodiments of the present technology provide for an automation framework that allows for efficient management of signal distribution, resource allocation, scheduling, and more.

20 Claims, 8 Drawing Sheets

Related U.S. Application Data continuation of application No. 15/077,838, filed on Mar. 22, 2016, now Pat. No. 9,749,884.

(51) Int. Cl.
  *H04W 88/02* (2009.01)
  *H04W 88/18* (2009.01)

(52) U.S. Cl.
  CPC ............ *H04L 43/50* (2013.01); *H04W 88/02* (2013.01); *H04W 88/18* (2013.01)

(56) References Cited

U.S. PATENT DOCUMENTS

| | | | |
|---|---|---|---|
| 9,189,378 B1 | 11/2015 | Ryan et al. | |
| 9,749,884 B1* | 8/2017 | Cummings | ........... H04L 43/045 |
| 10,021,580 B2* | 7/2018 | Cummings | ........... H04L 43/045 |
| 2012/0129301 A1 | 5/2012 | Or-Bach et al. | |
| 2012/0198279 A1 | 8/2012 | Schroeder | |
| 2014/0062781 A1 | 3/2014 | Mathews et al. | |
| 2015/0082282 A1 | 3/2015 | Larsen et al. | |
| 2015/0228125 A1* | 8/2015 | Silva | .................... G01C 21/362 |
| | | | 705/13 |
| 2017/0325109 A1 | 11/2017 | Cummings | |

FOREIGN PATENT DOCUMENTS

| | | |
|---|---|---|
| KP | 101540141 B1 | 7/2015 |
| KP | 20150135198 A | 12/2015 |

OTHER PUBLICATIONS

Lihosit et al., U.S. Appl. No. 14/791,221, "Remote Device Modification," filed Jul. 2, 2015, 31 pages.
Lihosit et al., U.S. Appl. No. 14/802,894, "Network Diagnostic Applications," filed Jul. 17, 2015, 47 pages.
Tanshu, "Hardware testing of mobile phones," 36 slides available at www.slideshare.net/tanshu9871/hardware-testing-of-mobile-phones-1; retrieved May 5, 2016; 3 pages.
U.S. Appl. No. 15/660,908 (issued as U.S. Pat. No. 10,021,580), filed Jul. 26, 2017; titled Mobile Device Validation.
U.S. Appl. No. 15/077,838 (issued as U.S. Pat. No. 9,749,884), filed Mar. 22, 2016; titled Mobile Device Validation.

* cited by examiner

MOBILE DEVICE VALIDATION

CROSS-REFERENCE TO RELATED APPLICATION

This application is a continuation of U.S. patent application Ser. No. 15/660,908, filed Jul. 26, 2017, entitled "MOBILE DEVICE VALIDATION"; which is a continuation of U.S. patent application Ser. No. 15/077,838, filed Mar. 22, 2016, entitled "MOBILE DEVICE VALIDATION", now U.S. Pat. No. 9,749,884; both of which are incorporated by reference in their entireties.

BACKGROUND

Modern mobile electronic devices (such as mobile phones, computer tablets, personal digital assistants, or the like) have become a common part of modern life. These devices are constantly being redesigned or improved to provide more advanced features, computing power, and communication capabilities. In some cases, mobile device manufacturers may even create entirely new devices or iterate on current designs. The new devices or design iterations may be based on user feedback, availability and/or cost of new technologies, and new design ideas to improve a user's experience with the devices. The modifications can be hardware or software related. For example, mobile device manufacturers recently designed mobile devices with multiple antennas to improve a user's satisfaction with web browsing and calling.

In addition to the device modifications made by mobile device manufacturers, wireless service providers are continually upgrading and modifying the infrastructure used by the mobile devices. These upgrades and modifications to the infrastructure may happen at different rates. For example, a highly populated urban environment may see faster upgrades to the wireless infrastructure than rural areas. In addition, a carrier may use different hardware suppliers for building/upgrading different portions of its network. As a result, mobile devices need to be able to work with a variety of different base stations and protocols. However, ensuring all of the features of a mobile device work in different environments is difficult. It is with respect to these and other problems that embodiments of the present technology have been made.

BRIEF DESCRIPTION OF THE DRAWINGS

Embodiments of the present technology will be described and explained through the use of the accompanying drawings in which.

Figure 1:
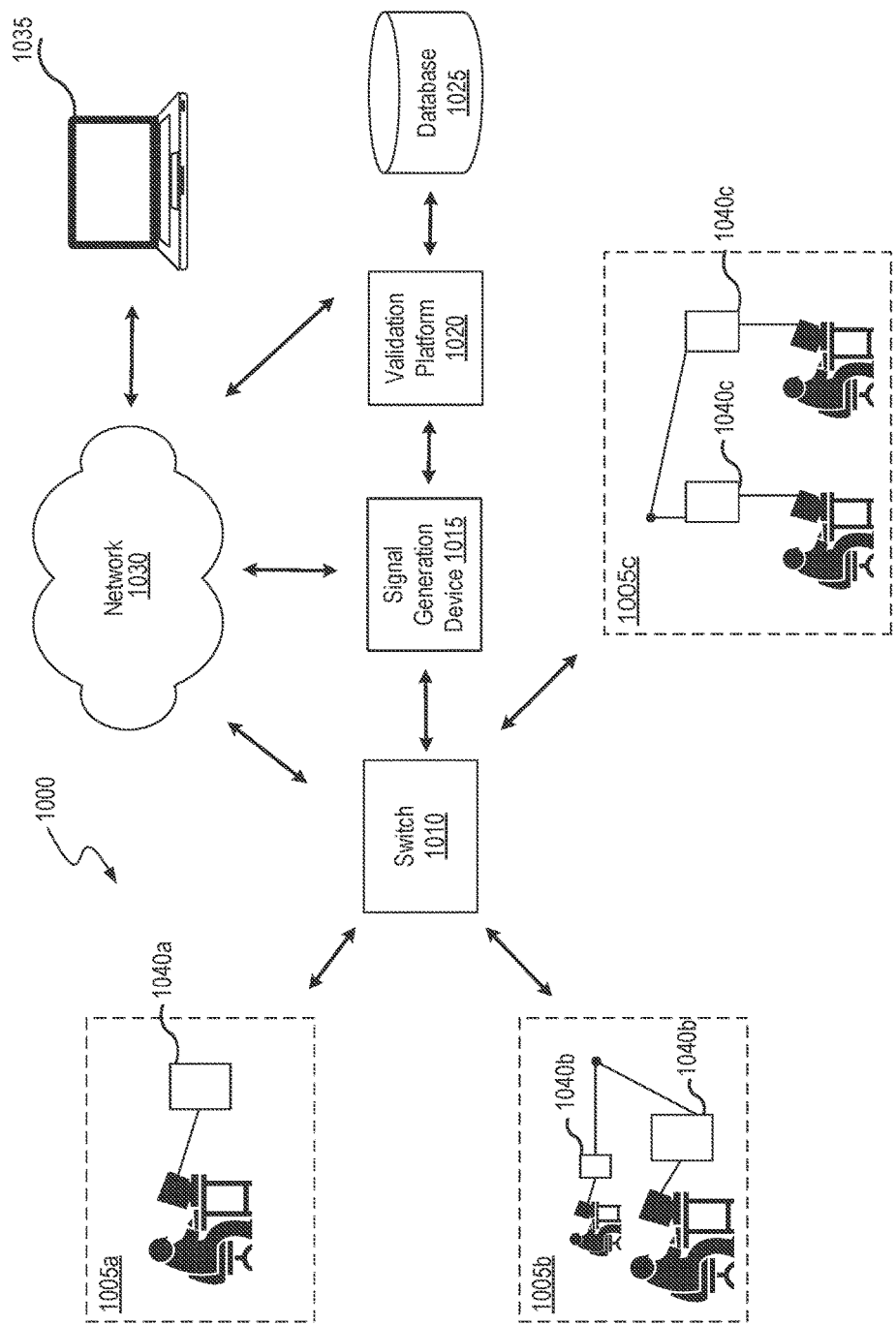
FIG. 1 illustrates an example of a validation environment that may be used in accordance with some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Before wireless providers or mobile device manufacturers support or release a mobile device design with new or modified features, the device design must be validated to ensure the device design will perform as expected. However, there are a number of challenges and inefficiencies created in traditional validation techniques. Some of these challenges are related to the variety of wireless signals the device may experience and difficulty in creating different environments (e.g., 3G, LTE, 4G) where the mobile device designs may be tested. Other challenges are related to the large number of tests, requests for tests, and limited resources for validating or testing wireless provider infrastructure. All of these result in a difficult validation process.

Various embodiments of the validation platform provide an automation framework for efficient, systematic and trackable management of signal distribution, resource allocation, and scheduling. More specifically, some embodiments of the validation platform manage signal distribution and lab resources in design validation environments where a variety of communication signals typically available on a wireless provider's network need to be produced for validation. For example, some embodiments can provide a validation environment with LTE, 3G, 4G, and 5G signals to allow engineers to test VoLTE, SMS, MMS, calling, web browsing, or other features of a mobile device design. Also, the validation platform can be used for validating software and hardware associated with the mobile device and for validating use of the mobile device on different configurations of wireless provider infrastructure.

Some embodiments of the validation platform provide a graphical interface that allows engineers to request a validation of mobile device, view the progress of validation, review validation plans, and modify validation testing. As an example, the validation platform can display a graphical user interface (GUI) with lab resources that are in use and the types of signals being used in the validation process. The validation platform may allow access via a webpage or allow users to download an application to a computing device that will connect to the validation platform.

Also, the validation platform can validate features or components of a wireless network for a mobile device design. Wireless network providers often provide updated or modified signals and services for mobile devices. To validate these updated or modified signals and services, the validation platform provides these updated or modified signals in a testing environment where engineers can validate the signals and services for a mobile device design. For example, if a wireless network provider implements new hardware and software in its wireless network, the validation platform can execute multiple validation tests for various mobile device designs to validate the new hardware and software. As another example, the validation platform can validate a voice over LTE-U feature provided by a wireless network works with a mobile device design.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to mobile device design, embodiments of the present technology are equally applicable to various other electronic device designs such as laptop, desktop, or wearable electronics.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of a validation environment 1000 in accordance some embodiments of the present technology. As illustrated in FIG. 1, validation environment 1000 includes one or more testing centers 1005a-c, a switch 1010, a signal generation device 1015, a validation platform 1020, a customized database 1025, network 1030, a computing device 1035, and signal distribution panels 1040a-c. As a broad overview to the validation environment 1000, the validation platform 1020 controls and organizes the validation of a mobile device design with specific sets of testing signals sent to testing centers 1005a-c at set times and for set durations. The validation platform 1020 can access a database with information regarding testing center availability and equipment lists and reserve the testing center. For example, the validation platform 1020 can organize the validation of a mobile device design that requires eight different testing signals, thirty engineers, two hundred validation tests, and fifteen testing centers. Also, in validation environment 1000, validation platform 1020 can validate wireless provider infrastructure (e.g., software, protocols, base station transceiver communication, service level, and the like) for a mobile device design.

The validation platform 1020 can be a combination of hardware and software that integrates the management of signal distribution, resource allocation, inventory management, scheduling, and conflict resolution for validation testing. The validation platform 1020 can also provide a graphical interface that allows engineers to view the progress of validation and the schedule of other validation requests. The validation platform 1020 can have a variety of different components some of which are described in more detail in FIG. 4. As a brief overview of the components, the validation platform 1020 may have components that select and control the distribution of testing signals required for a validation test to a particular testing center. The validation platform 1020 can also track the progress of the validation test.

As shown in FIG. 1, validation environment 1000 can have several testing centers 1005a-c. A testing center may include laboratory equipment that can be used to perform tests with a mobile device or other electrical equipment. The laboratory equipment can include radio equipment, cables, power outlets, sensors for radio waves, power supply, and safety equipment. Engineers inside the testing center can execute tests on mobile devices or test the signals provided by a wireless network. Also, testing centers 1005a-c may include one or more RF enclosures where a user can place a device or prototype device to undergo validation testing. The enclosures can be designed to receive specific sets of wireless signals generated by signal generation device 1015. One example of such an RF enclosure (e.g., a case) is described in more detail in FIG. 2.

To route the testing signals to specifically selected locations at desired times, validation environment 1000 includes a switch 1010. A switch is used to route signals to testing centers. More specifically, a switch is a device that channels incoming signals from multiple input ports to a specific output port or ports that will take the signal toward an intended destination (e.g., a case within a testing center). A switch 1010 can route a signal using software, hardware (e.g., a specially designed circuit), or a combination of hardware and software. Switches can also include a matrix (e.g., a routing table) to direct signals to a destination. Also, the switch 1010 receives control signals from the validation platform 1020. As an example, in validation testing of a mobile device design, a validation platform can instruction a switch to direct LTE, UTMS, GSM, and LTE-U signals to one or several testing centers in a validation environment at a specific time. As described below, the switch receives signals from the signal generation device 1015.

Prior to routing a signal, the switch 1010 receives a signal from the signal generation device 1015. The signal generation device 1015 generates a signal or signals based on instructions received from the validation platform. In some implementations, the signal generation device 1015 can include a base station transceiver used in telecommunications. While not shown in FIG. 2, a validation environment can have several signal generation devices 1015, and each signal generation device can have different properties. As an example, a validation environment can have four different base station transceivers, each made by a different base station transceiver manufacturer. As another example, signal generation device 1015 can be the hardware that communicates directly with mobile devices like an Evolved Node B (eNB) that is controlled by a Mobility Management Entity (MME) as part of the LTE 4G platform. While FIG. 1 shows a signal generation device 1015 and a switch 1010 as separate devices, these devices can be integrated into one device. Also, a validation platform 1020 can communicate with a signal generation device 1015 to determine what signals are available or other information regarding the signal generation device (e.g., manufacturer of device, number of ports available, etc.).

Database 1025 can be configured to store a dataset with data related to the mobile device design validation process. In some implementations, the database 1025 stores scheduling information for a validation test, required testing signals for a validation, the project name for validation of a mobile device, the lab resources and equipment available for validation, and feedback data from validation testing (e.g., a test is complete). The validation platform 1020 can access and modify data in database 1025. Some examples of information stored in database 1025 are shown below. As shown below, these examples are related to the 3rd Generation Partnership Project (3GPP).

TABLE 1

Testing Signal Available for Routing

| Signal 1 | UTMS  | Site 3 | PSC235   | UARFCN 512 |
|----------|-------|--------|----------|------------|
| Signal 2 | GSM   | Site 2 | Standard | BCCH670    |
| Signal 3 | LTE   | Site 4 | PCI345   | EARFCN2000 |
| Signal 4 | LTE-U | Site 5 | PCI200   | EARFCN2000 |

TABLE 2

Testing Center

| Testing Center ID | Location | Availability | Equipment Available |
|---|---|---|---|
| 1 | Seattle, WA, Room 1 | No reservations | Case 1, laptop, signal distribution panel 1, 2 work stations |
| 2 | Bellevue WA, Room 2, 44th floor | 3 reservations | Case 2, laptop, signal distribution panel 2, safety equipment |
| 3 | Seattle, WA, Room 7, Station 2 | 4 reservations | Case 3, laptop, signal distribution panel 3, safety equipment, 1 work station |
| 4 | Bellevue WA, Room 2, 44th floor | 5 reservations | Case 4, laptop, signal distribution panel 3, safety equipment, 1 work station |

TABLE 3

Validation Testing Details

| Type of Validation | Requirements | Number of Engineers | Number of Testing Centers to Complete Validation | Estimated Time for Completion |
|---|---|---|---|---|
| Voice over IP (VoIP) | Successfully complete 99 out 100 voice calls for 2 min using IP on mobile device for all signals provided by wireless provider | 4 | 6 | 1 week |
| SMS | Successfully send and receive 15 SMS messages for all testing signals, where messages vary in length and content (e.g., pictures and text) | 10 | 6 | 2 days |

TABLE 3-continued

Validation Testing Details

| Type of Validation | Requirements | Number of Engineers | Number of Testing Centers to Complete Validation | Estimated Time for Completion |
|---|---|---|---|---|
| Calling | Successfully place and receive 50 of 60 calls using all signals provided by wireless provider | 5 | 2 | 1 weeks |

Other information can be stored in database 1025. In some embodiments, the validation platform 1020 identifies a team of engineers for a validation project and the associated security badges for these engineers. When reserving a testing center for a validation test, the validation platform can instruct the security system (e.g., badge operated doors) to only open if an engineer on the validation reservation presents his or her badge to open the testing center.

Additionally, the database 1025 may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files. To facilitate providing a validation testing, the components described in FIG. 4 accesses and modify the data stored in database 1025.

Network 1030 allows for communication in validation environment 1000. Network 1030 may include wireless networks such as, but not limited to, one or more of a Local Area Network (LAN), Wireless Local Area Network (WLAN), a Wide Area Network (WAN), Global System for Mobile Communications (GSM), Bluetooth, WiFi, Fixed Wireless Data, 2G, 2.5G, 3G, 4G, 5G, LTE networks, using messaging protocols such as TCP/IP, SMS, MMS, or any other wireless data networks or messaging services. Network 1030 may also include wired networks. Also, the components shown in FIG. 1 can communicate using network 1030.

Another device that can connect to network 1030 is computing device 1035. Computing device 1035 is used to communicate with components of validation environment 1000. In some implementations, a mobile device manufacturer or engineer is using his laptop (e.g., the computing device) and a design application to create a mobile device design which can be used to send the design information to the validation platform. Some other examples of computing devices are a server, tablet, or other processor based device used in the manufacturing and design of mobile devices. Also, third parties such as businesses, manufacturers, wireless providers, or research companies gather information from or sent information to validation platform 1020 using computing device 1035.

As shown in FIG. 1, validation environment 1000 also includes signal distribution panels 1040*a-d*. Signal distribution panels 1040*a-d* provide a testing signal or signals to a testing center. For example, a switch 1010 may route four signals to a testing center 1005*a-c*, and the distribution panel may output one to four signals in the testing center. Signal distribution panels are described in more detail in FIG. 2.

Figure 2:
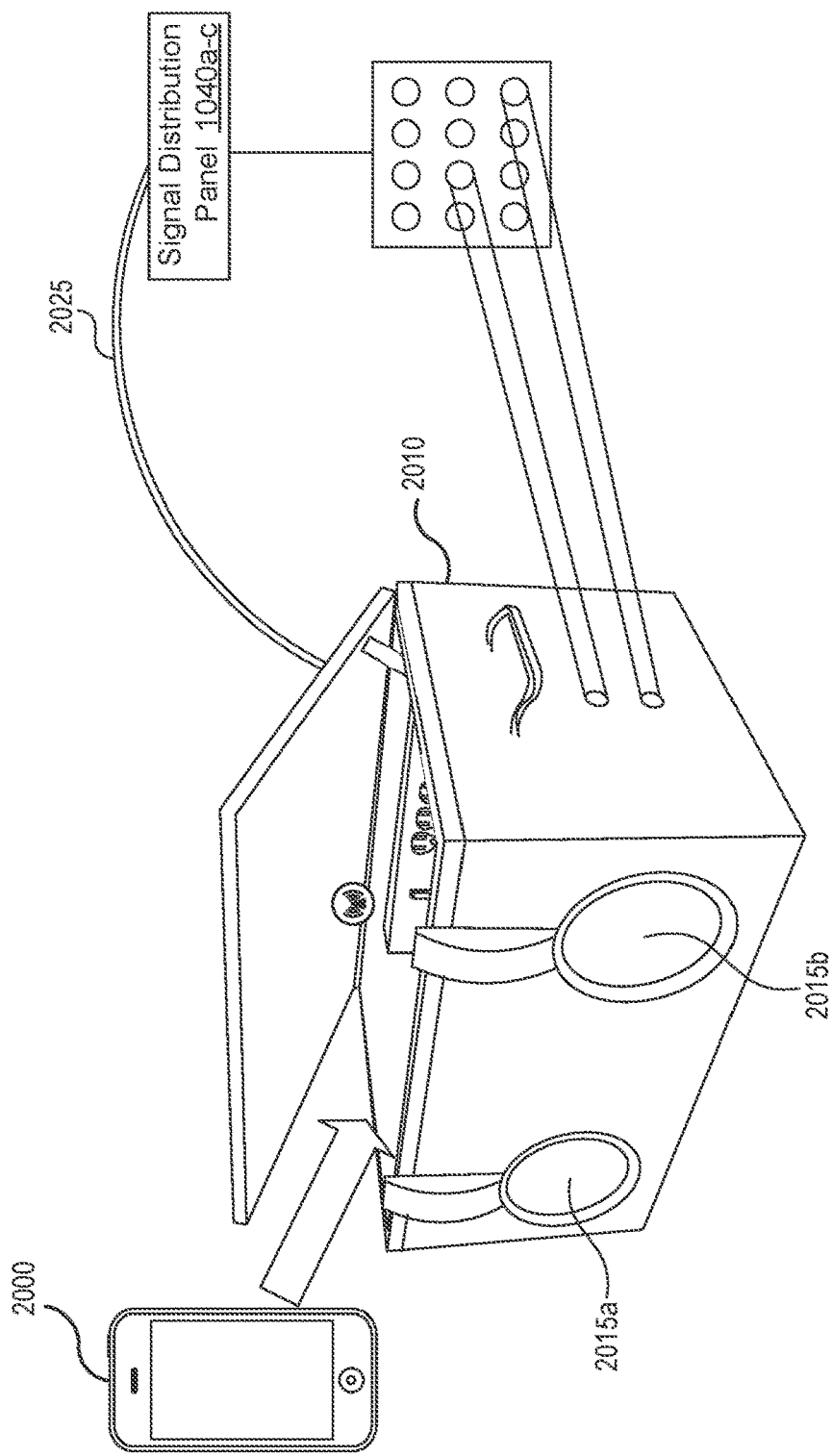
FIG. 2 illustrates an example of a testing center within the validation environment illustrated in FIG. 1.

FIG. 2 illustrates an example of a testing center 1005*a-c* within the validation environment 1000 illustrated in FIG. 1.

As illustrated in FIG. 2, a mobile device 2000 can be placed (e.g., by an engineer or an automated placement mechanism) in an enclosure 2010 (also referred to as a "case") that is connected to a signal distribution panel 1040a-c. The case 2010 may also include one or more antennas that emit a testing signal or signals within the case. The case 2010 may include one or more access entry points 2015a-b that can be used by engineer to perform tests on the mobile device in the case 2010. In accordance with some embodiments, the entry points 2015a-b can be shielded gloves made of special material to reduce electromagnetic radiation emitted into the case 2010. Also, while not shown in FIG. 2, a microprocessor can control the opening and closing of enclosure 2010 and the insertion of the mobile device into the enclosure 2010.

The case 2010 may be used to reduce noise or signal interference (e.g., unwanted LTE or UMTS signals) from the environment surrounding the case (e.g., the testing center). In some implementations, the case 2010 may be composed of material that reduces electromagnetic radiation such lead or another heavy metal. Alternatively, the case 2010 can include electric and magnetic fields that operate to oppose or cancel electromagnetic waves (EM) from entering the case. For example, in some embodiments, the case 2010 can be a Faraday cage. Also, the case 2010 can include power outlets (e.g., AC or DC power) to charge mobile devices.

The case 2010 can be connected to a signal distribution panel 1040a-c. A signal distribution panel accepts signals (e.g., signals traveling in cables connected to internal antennas) from signal generation devices and distributes the signals directly into case 2010 (e.g., by opening and closing a local circuit). A signal distribution panel can have several (e.g., 12 or more ports) outputs and the signal distribution panel can turn on or offer a signal from each port. As shown in FIG. 2, signal distribution panel 1040a-c has two active port (e.g., two testing signals that are entering a case) and ten inactive ports.

Case 2010 and signal distribution panel 1040a-c may also be connected to a feedback connection 2025. The feedback connection 2025 can be used to send data related to the validation testing environment to the validation platform. In some embodiments, the case 2010 includes sensors (e.g., signal strength sensor, motion sensor, timer, light sensor, temperature sensor, and the like) and these sensors send information to the validation platform 1020 via the feedback loop 2025.

Figure 3:
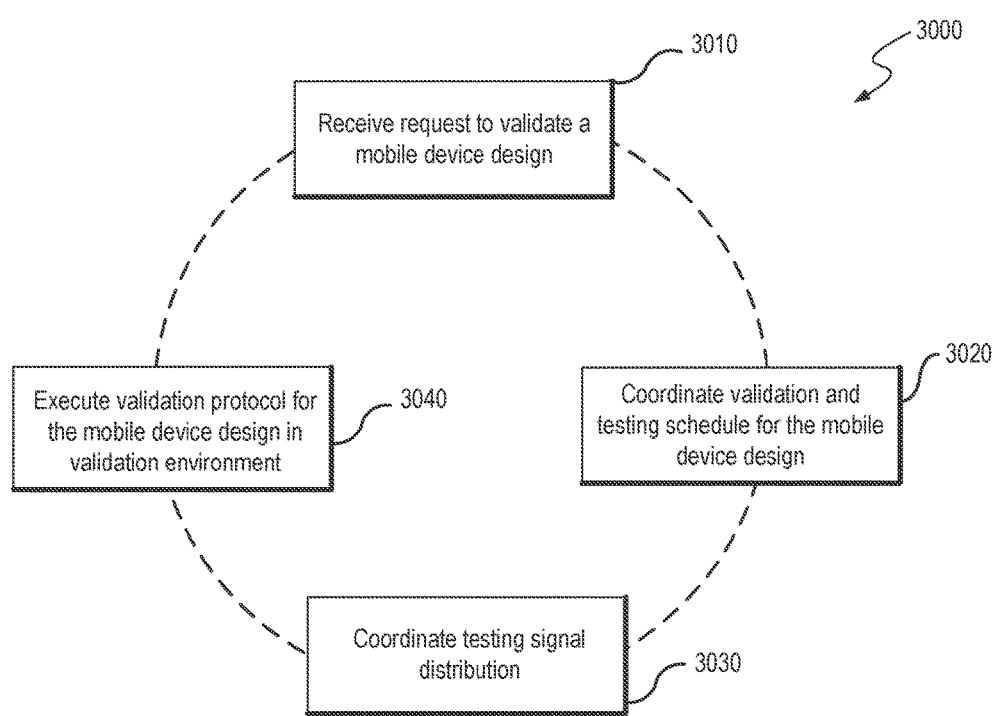
FIG. 3 illustrates an overview of an example validation process that may be used in accordance with various embodiments the present technology.

FIG. 3 illustrates an overview of an example validation process 3000 that may be used in accordance with various embodiments the present technology. As illustrated in FIG. 3, during receiving operation 3010, a validation platform 1020 receives a request to validate a mobile device design and executes a process to validate the mobile device design. Validation platform 1020 may receive the mobile device design from a mobile device manufacturer or other design team that submits a prototype of a mobile device design from a design application coupled to the validation platform 1020. In accordance with various embodiments, the submission may or may not include a specific set of tests or testing protocol to be performed. As an example, a validation platform 1020 may receive a prototype mobile device and its associated design with a request to validate the device for use on a 4G network or LTE-U. This request may include validating the mobile design for calling, browsing, and message sending capability. Alternatively, a wireless provider may request to test a mobile device because the wireless provider has updated hardware and software in its wireless network. In response to the submission, the validation platform 1020 may identify an initial or additional set of tests that could be performed.

Once the validation platform 1020 receives the request to validate the mobile device design, the validation platform 1020 coordinates the validation and testing schedule for the mobile device design during coordination operation 3020. A validation plan can include series of tests, associated testing signals, and associated testing centers necessary to complete the validation process. A validation plan may also include a detailed list of steps and operations for testing functions of the mobile device design (e.g., calling, messaging, web browsing, VoIP, email, etc.). In some embodiments, the validation plan may include a testing schedule (e.g., dates and times) and testing center where the testing signals will be supplied during the testing schedule. The validation platform 1020 may also be connected to various security systems and grant temporary access to the testing center during the scheduled dates and times.

A validation plan can have associated parameters identifying criteria or resources required to complete validation plan. Some examples of parameters are testing signal type (e.g., LTE, UTMS, 3G, 4G), the lab equipment required for performing the tests, the location of the tests, the number of engineers necessary to perform the testing, engineering certifications, the number of tests required for a validation, and the criteria requirement for validation (e.g., 95% success rate when calling or sending messages using a testing signal). In some implementations, a engineer can modify or determine the validation plan and associated parameters. For example, the engineer can determine that a smart phone design needs to be validated for GSM compatibility with particular GSM signals, which will require a team of fifteen engineers and four testing centers with base station transceivers that emit GSM signals. Alternatively, the validation platform 1020 can automatically determine a validation plan and associated parameters based on the request if the request includes a validation for specific features.

Once the validation plan and associated parameters are set, the validation platform 1020 can issue the validation plan and coordinate testing signal distribution with a switch and signal generation device at distribution operation 3030. The validation platform 1020 can also execute a validation protocol for mobile device designs in a validation environment at execute protocol operation 3040. The validation platform can instruct the switch to route testing signals to each testing center, and engineers in the testing center can use the testing signals to complete portions of the validation protocol.

Figure 4:
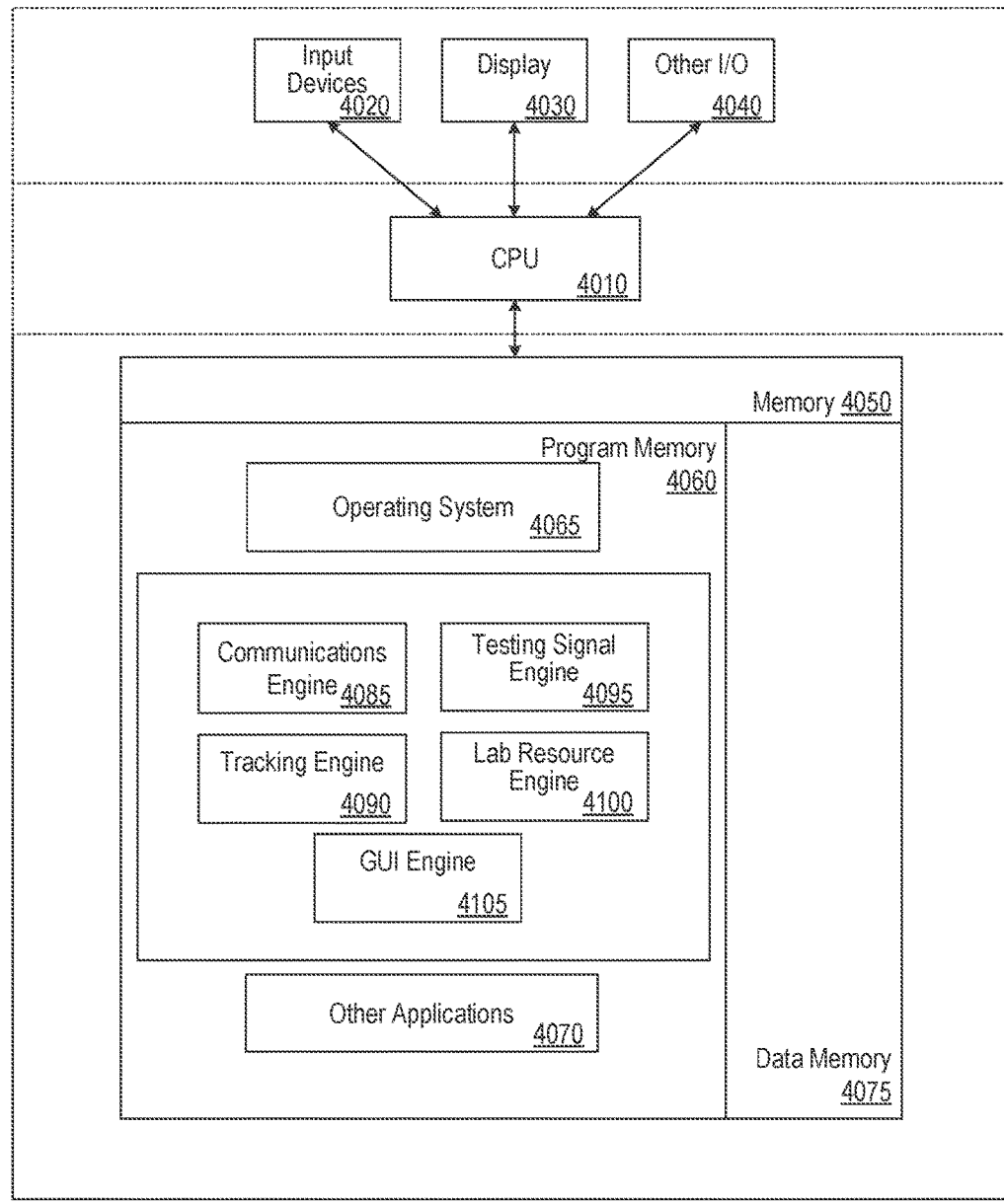
FIG. 4 illustrates an example of a set of components of a validation platform in accordance with one or more embodiments of the present technology.

FIG. 4 illustrates an example of a set of components within a validation platform 1020 in accordance with one or more embodiments of the present technology. As shown in FIG. 4, validation platform 1020 may include a central processing unit 4010, input devices 4020, display 4030, other input and output (I/O) 4040, a memory 4050, program memory 4060, an operating system 4065, data memory 4075, a communications engine 4085, a tracking engine 4090, a testing signal engine 4095, a lab resource engine 4100, a graphical user interface (GUI) engine 4105 and/or other components. Validation platform 1020 can include a variety of computing devices such as a personal computer, server, laptop, smartphone (e.g., iPhone™), tablet device, mobile device, or other microprocessor-based system or programmable consumer electronic device. In some embodiments, components of validation platform 1020 can be on a server or components can be partially located on another computing device.

CPU 4010 can be a single processing unit or multiple processing units in a device or distributed across multiple devices. CPU 4010 can be coupled to other hardware devices, for example, via a small computer system interface (SCSI) bus. CPU 4010 can communicate with a hardware controller for devices, such as to a display 4030 that is used to display text and graphics. In some implementations, display 4030 provides graphical and textual feedback to a engineer. Alternatively, the display 4030 can be separate from the input device 4020. Examples of display devices are an LCD display screen, an LED display screen, or an augmented reality display (e.g., a head-mounted device). Other input/output (I/O) devices 4040 can also be coupled to the CPU 4010, such as a network card, video card, audio card, USB, FireWire or other external device, camera, printer, speakers, flash memory card, CD-ROM drive, or DVD drive.

Validation platform 1020 may also include a communication component (not shown) for wireless and wire-based communication. For example, the CPU 4010 can communicate using the Institute of Electrical and Electronics Engineers (IEEE) 802.11 wireless communication standards. The communication component can communicate with another device or a server through a network using, for example, TCP/IP protocols.

CPU 4010 can access memory 4050. Memory 4050 includes one or more of various hardware devices for volatile and non-volatile storage and can include both read-only and writable memory. For example, memory 4050 can comprise random access memory (RAM), CPU registers, read-only memory (ROM), and writable non-volatile memory such as flash memory, hard drives, magnetic storage devices, and device buffers.

Memory 4050 can also include computer-executable instructions, such as routines executed by the CPU. Memory 4050 can include program memory 4060 that stores programs and software, such as an operating system 4065, other applications 4070 (described in more detail below), and data memory 4075 In some implementations, program memory 4060 includes algorithms such as a sequencing, benchmark, or testing algorithm. Memory 4050 can also include data memory 4075 that is used to store such user data as passwords, usernames, input text, audio, video, user preferences, configuration data, settings, user options, and time stamps. Data in data memory 4080 can be read, modified, and deleted by the CPU.

As shown in FIG. 4, validation platform 1020 can include a communication engine 4085, a tracking engine 4090, a testing signal engine 4095, lab resource engine 4100, and GUI engine 4105. These components can be configured to execute methods or functions of the validation platform 1020 described herein and can include subcomponents or other logical entities that assist with or enable the performance of some or all of these methods or functions. These components can communicate with each other, meaning that they share data and analysis results between modules.

The communication engine 4085 can gather request information for a validation request. The communication engine 4085 may gather information directly from a engineer using a questionnaire. Such information may include common metrics for a validation plan such as project name, number of testing signals, features to be tested, time period to complete validation, location of validation environment, engineer contact information, username, or required lab resources. The communication engine 4085 may also retrieve validation information from other services, such as a third party requester (e.g., a business or manufacturer that is requesting validation), by accessing another database.

While a communication engine 4085 can gather information for a validation process, the tracking engine 4090 can gather information related to validation testing progress and performance. In some implementations, tracking engine 4090 can monitor the number of tasks that a engineer has completed for a validation process or the time it took to complete a task within the validation process. For example, an engine may be assigned to testing voice calls for a mobile device in with an LTE signal. In such an example, the engine must test receiving, sending, and conducting calls using the LTE testing signal; as the engineer completes the tasks, instructions can be sent to the validation platform that a task is complete. In some implementations, the tracking engine 4090 monitors a validation plan for feedback. Feedback may be automatically collected and reported, reported by the engineer in the testing center (e.g., via a testing application) or automatically from the equipment in the testing center.

In addition to tracking the progress of a validation process, tracking engine 4085 can send reminders to engineers. The tracking engine can access a database of lab reservations and equipment and a schedule associated with the equipment. Using the schedule, the tracking engine 4095 can send electronic messages to engineers that a reservation is starting soon or that a reservation has expired. The tracking engine 4095 can also notify other components of the disclosed technology that a reservation has ended or the engineer has canceled or reschedule a validation process.

In general, the testing signal engine 4095 routes and modifies testing signals. As a broad overview, the testing signal engine 4095 sends instructions and receives data from the switch 1010 and signal generation device 1015. The testing signal engine 4095 can send instructions to route a testing signal from the signal generation device 1015 through the switch 1010 to a testing center 1005*a-c*. For example, a validation plan may require that ten different signals types are tested on a mobile device design. In such an example, the testing engine 4095 can send control signals to the switch to route the testing signals to a testing center.

Lab resource engine 4100 can determine the availability of testing center equipment, the inventory of lab equipment, and the status of equipment. Lab resource engine 4100 can query the database 1025 (in FIG. 1) and receive responses indicating the status, location, and availability of lab equipment (e.g., a case). Lab resource engine 4100 can also monitor lab equipment to ensure that is working. For example, if a case is broken or a device in the testing center is not working property (e.g., engineers continually report errors), the lab resource engine can communicate with other components to ensure the faulty device or error is fixed before further use.

GUI Engine 4105 can generate one or more GUIs that allow for interaction with a engineer. In at least one embodiment, GUI Engine 4105 can generate a graphical user interface allowing an engineer to request a validation test, view progress of a validation test, request an additional testing signal, or determine if a validation project is complete. Example graphical user interfaces are described in more detail in FIG. 6 and FIG. 7.

Figure 5:
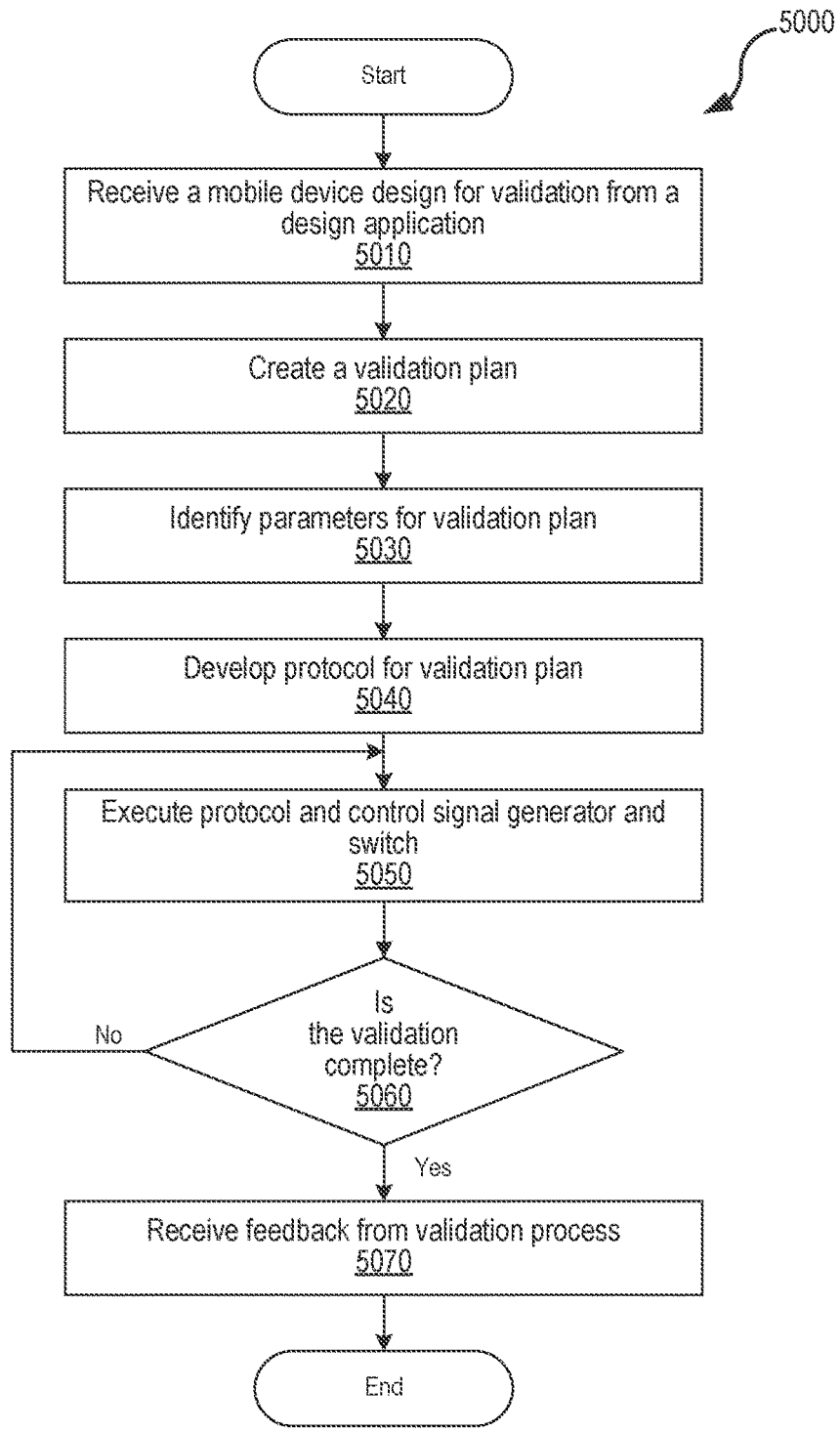
FIG. 5 is a flowchart illustrating an example of a set of operations for operating a validation platform that may be used in accordance with some embodiments of the present technology.

FIG. 5 is a flowchart illustrating an example of a set of operations 5000 for operating a validation platform 1020 in accordance with the present technology. These operations can be performed by the validation platform 1020 or the modules within the validation platform. As a broad overview to process 5000 as shown in FIG. 5, a validation platform receives request to validate a mobile device design, creates a validation plan for the mobile device design, identifies parameters (e.g., testing signals and lab resources) for the validation plan, develops a protocol (e.g., a set of instructions for completing validation tests) for the validation plan, executes the protocol, determines that the validation is completed, and collects feedback. Process 5000 can begin when a validation platform receives a request from a design application or when a engineer requests to validate a design. Process 5000 can be repeated for several mobile device designs, for different features of a mobile device, or for different infrastructure used by a mobile device design.

At receiving operation 5010, validation platform 1020 receives a mobile device design for validation. As described above, if a design application submits a mobile device design or designs, the validation platform 1020 can download the details of the validation request from the Internet. For example, a mobile device manufacturer can use a design application to transmit the design of thirty different mobile devices to a validation platform 1020. In such an example, the mobile device manufacturer can send the prototype devices associated with the designs to an engineer associated with validation platform 1020. Alternatively, an engineer can input the validation request for a mobile design into a validation platform 1020 manually. In some implementations, at receiving operation 5010, validation platform can receive a wireless network validation project that includes verifying that a new or modified component of a wireless network supports service for a mobile device. For example, the validation platform can receive a request to verify its voice over LTE-U feature works for a mobile device.

At creation operation 5020, validation platform 1020 generates a validation plan. A validation plan can include goals. Goals of a validation can be validating some or all features of a mobile device design. For example, validating software and hardware for a mobile device design with a wireless provider that uses LTE or GSM signals. Alternatively, goals can be validating functions (e.g., calling, browsing, sending and receiving messages) of a mobile device design. One method for determining goals of a validation plan is querying a engineer with a request form using a graphical user interface (e.g., questions related to specific validation tests that need to be completed). Additionally, goals of a validation plan can be determined by the validation platform based querying a database (e.g., database 1025) where a validation plan is stored or can be new test cases proposed by the manufacturer or the design engineer.

At identification operation 5030, validation platform identifies parameters for the validation plan. As described above, a validation plan is associated with goals. Goals are associated with parameters. Parameters are values or operations used to complete a goal of mobile device design validation test. For example, if a goal of mobile device design validation request is to validate its calling capability, some parameters associated with the goal will be testing signal type (e.g., LTE, GSM, UTMS), the availability of testing centers capable of providing these signals, project name for the validation test, and the number of tests that need be completed to validate the calling feature. The validation platform 1020 can determine these parameters by querying an engineer using a graphical user interface. For example, using a graphical user interface provided by the validation platform 1020, an engineer can request to validate VoLTE for a mobile device design using an LTE signal provided in a testing center located near the engineer.

At protocol operation 5040, validation platform 1020 develops a protocol for the validation plan. A protocol can include a procedure with a list of steps for validating a mobile device design with associated resources. A protocol can be based on the validation plan and associated parameters. A protocol can be simple. For example, a protocol to determine if a mobile device can support VoLTE can include a validation platform 1020 reserving a testing center, routing LTE signals to that testing center, and receiving confirmation from a engineer that the VoLTE worked (e.g., was validated). Alternatively, a protocol can be complex. For example, a protocol may require hundreds of tests for validating several features of a mobile device on various wireless provider networks. In such an example, the protocol may include a list of features (e.g., calling, web browsing, and the like) that need to be tested, the number of reservations and testing centers recommended for completing the tests, and the project name associated with the validation testing.

At execution operation 5050, validation platform 1020 executes the protocol and controls a signal generator and switch. Executing the protocol can include reserving the testing centers 1005*a-c*, distributing/routing the testing signals to each testing center 1005*a-c*, and tracking the progress of the testing. To reserve a testing center 1005*a-c*, the validation platform 1020 can receive a request from an engineer to perform a test at certain time, reserve the testing center for that scheduled time, and grant access to the engineer based on his or her employee access card. The validation platform 1020 can also instruct the switch 1010 to route a particular testing signal associated with a test to the testing center. An engineer can report that a test is done and outputs the results of the validation test. Alternatively, a validation platform 1020 can assume that a test is complete after a reservation has expired.

At decision operation 5060, validation platform 1020 determines if a validation is complete. If decision operation 5060 determines that a validation is complete, then decision operation 5060 proceeds to feedback operation 5070 of process 5000. A validation platform can determine that a validation is complete by receiving an electronic report from an engineer that he or she completed the validation testing. If the validation platform 1020 determines that a validation is not complete, the validation platform 1020 waits unit a validation is complete (e.g., the validation platform stays in execution operation 5050 until the validation is complete). For example, an engineer may still be testing a mobile device design.

At feedback operation 5070, the validation platform 1020 receives feedback from a testing center. The validation platform 1020 can collect this feedback using a questionnaire provided to the engineer after the engineer has completed the validation testing. For example, the engineer can send information that a validation was complete and the results were satisfactory. An engineer can use his or her laptop or workstation inside of a testing center to upload validation testing results.

In addition to receiving feedback from a engineer at feedback operation 5070, a validation platform 1020 can receive feedback from lab equipment. In some implementations, lab equipment inside a testing center can transmit data from sensors to the validation platform 1020. For example, a sensor can automatically transmit testing signal strength data to the validation platform 1020. As another example, a sensor inside a case used in the testing center can transmit a detected signal error.

Overall, process 5000 ends when a validation is complete and feedback has been received. The validation platform can repeat the process 5000 multiple times and for several mobile device designs.

Figure 6:
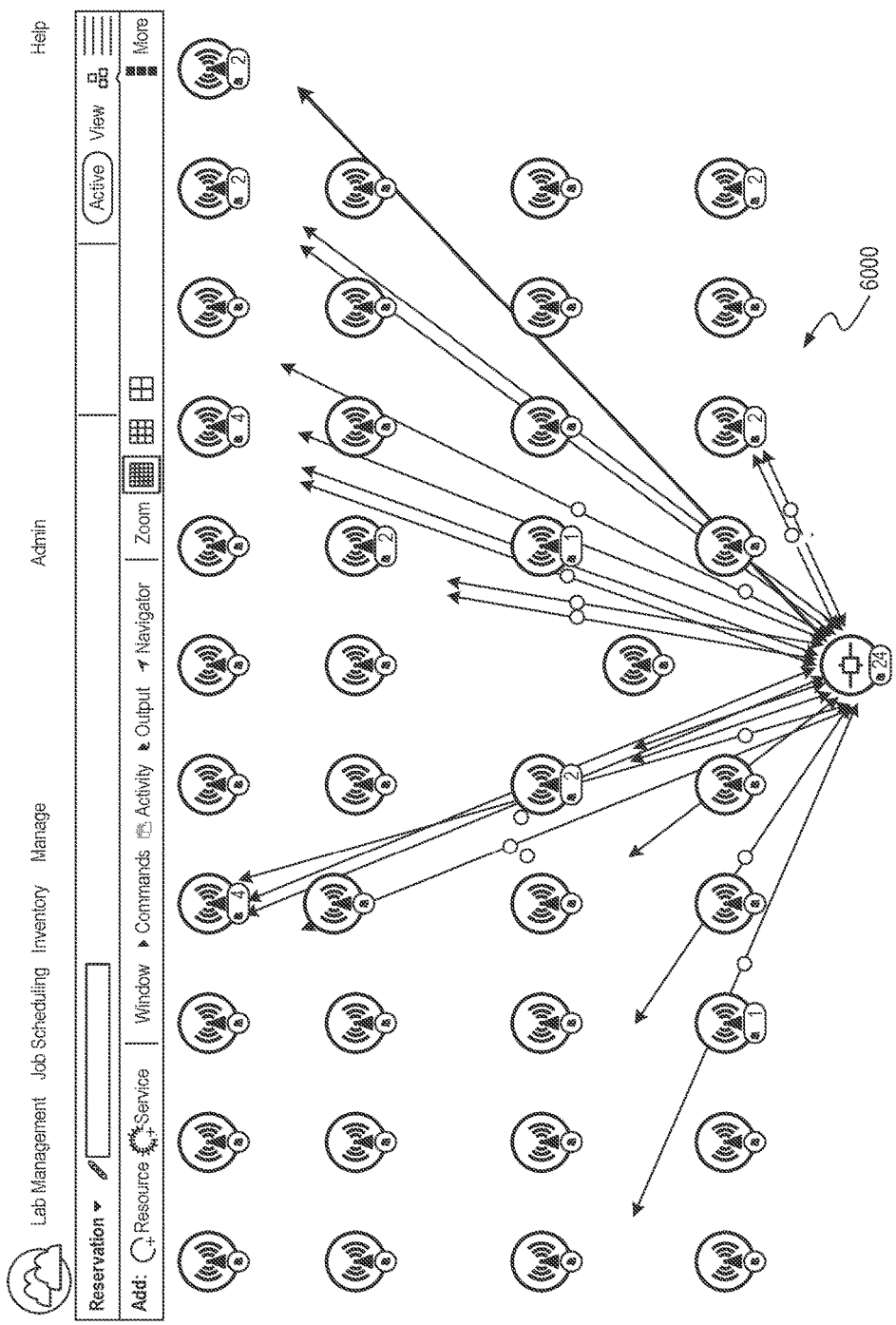
FIG. 6 is an example graphical interface that may be used in accordance with various embodiments of the present technology.

FIG. 6 is an example graphical interface in accordance with the present technology. A GUI engine can generate the graphical interface 6000 shown in FIG. 6. As shown in graphical interface 6000, the top of the graphical interface has a drop-down menu a engineer can use to interact with the graphical interface. The graphical interface 6000 also includes a search feature where engineers can use keyword searching to identify elements of the validation environment such as a specific testing center. Engineers can view several testing centers in a validation environment. In general, graphical interface 6000 displays the signals that are distributed to a testing center, the number of engineers in the testing center, and the signal generation device that is sending the signals to each testing center.

As shown in graphical interface 6000, a signal generation device can be represented at the bottom of the screen with a symbol. The signal generation device is sending testing signals to multiple testing centers represented with another symbol. Testing centers can receive multiple testing signals based on the validation plan and execution of the protocol or based on signal requests from engineers. In general, a person can with a mobile device or laptop can view the graphical interface 6000 from any location.

Figure 7:
FIG. 7 is another example graphical interface that may be used in accordance with one or more embodiments of the present technology.

FIG. 7 is an another example graphical interface that can be used in accordance with the disclosed technology. As shown in FIG. 7, graphical interface 7000 is a request form. The form includes fields for engineers to enter specific features of a desired signal for a validation test. On the left side of graphical interface 7000 is a field name such as schedule, name, and lab location. In the middle of graphical interface 7000 is a value associated with the field. Some examples of values can be a time period or date (e.g., for scheduling) and a specific location (e.g., New York or Seattle lab). On the right side of graphical interface 7000 is a pencil symbol, which is a button that engineers can use to enter or edit information in a field (e.g., change the value). In general, engineers can use the graphical interface 7000 to request a validation test or request additional information resources for an existing validation project.

Figure 8:
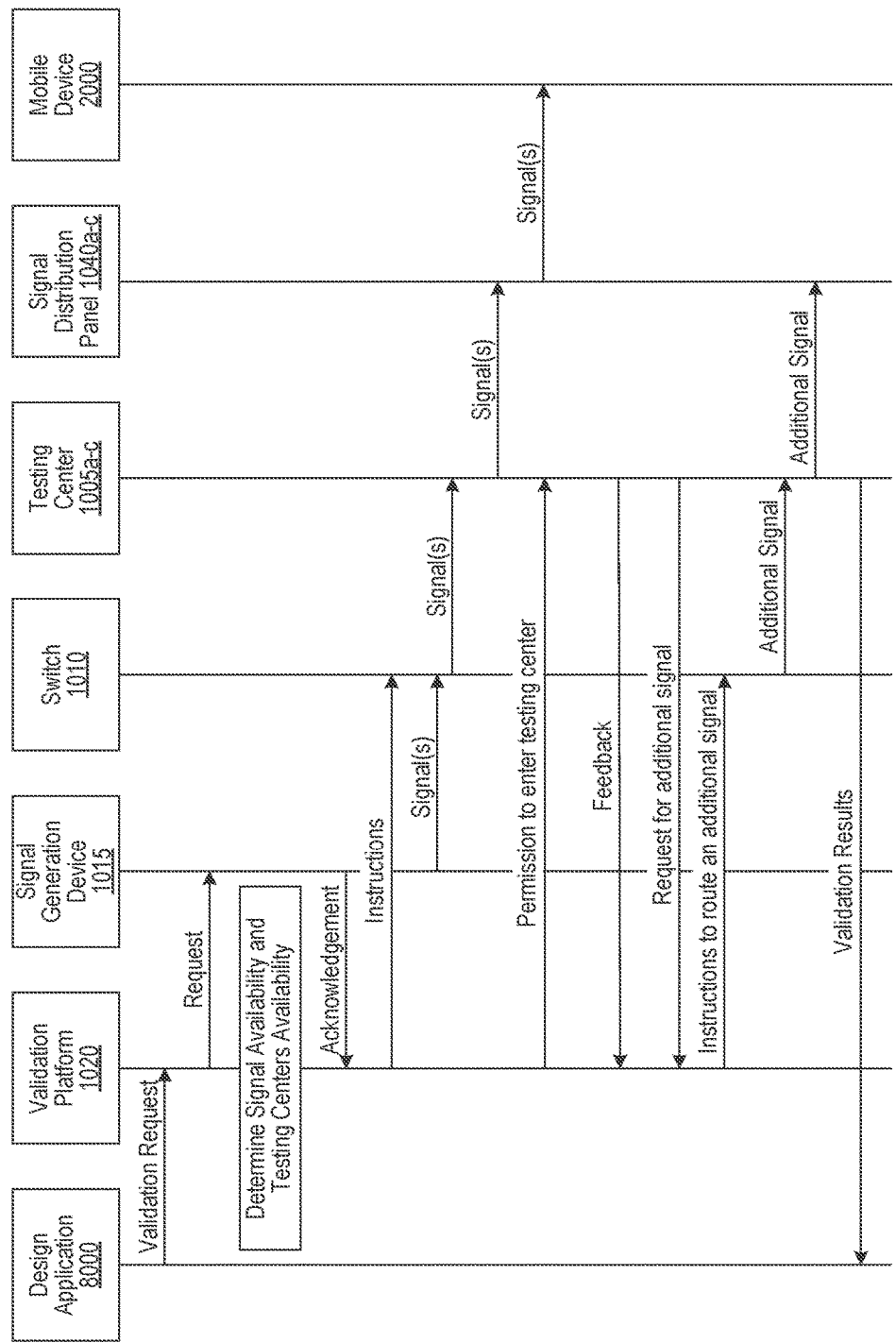
FIG. 8 is a sequence diagram illustrating an example of a set of interactions between components of a validation environment in accordance with the present technology.

FIG. 8 is a sequence diagram illustrating an example of a set of interactions between a variety of components within a validation environment. The vertical lines represent hardware devices (e.g., a switch, signal distribution panel, or mobile device) and associated software components (e.g., a validation platform and its components). The horizontal lines and arrows represent signals and communication (e.g., requests, responses, confirmation, feedback, instructions, control signals, and acknowledgments) between different hardware and software components. As shown in FIG. 8, a sequence includes interactions between a design application 8000, validation platform 1020, signal generation device 1015, switch 1010, testing center 100a-c, signal distribution panel 1040a-c, and a mobile device 2000. While not shown in FIG. 8, testing center 1005a-c can include a case connectively coupled to the signal distribution panel 1040a-c.

As shown on the left side of FIG. 8, a design application 8000 can send a mobile device design validation request to the validation platform 1020. The validation request can include technical details regarding a mobile device design. For example, the request can include details related to an antenna model, software version, and technical capabilities features (e.g., web browsing, VoIP, calling, SMS, MMS, and the like) of a mobile device design. In some embodiments, the validation request may include a request to validate the mobile device design for a specific signal (e.g., LTE-U) or function (e.g., SMS).

In response to receiving the validation request, the validation platform 1020 can query the signal generation device 1015 to determine testing signal availability. In such an example, the validation platform can receive an acknowledge of available signals (e.g., UTMS, GSM, LTE-U). Additionally, while not shown in FIG. 8, the validation platform 1020 can determine the availability of testing centers and locations of testing centers that can receive testing signals by querying a database (e.g., database 1025). With testing center availability and signal testing availability, the validation platform 1020 can route testing signals from the signal generation device to a desired testing center 1005a-c (where validation testing is to be performed) by sending instructions to the switch 1010. Once the switch 1010 routes the testing signals to the appropriate testing center 1005a-c, a signal distribution panel 1040a-c receives and controls the signal. Also, in some embodiments, the validation platform can send instructions to testing centers to grant access to specific access cards in order to allow engineers to perform validation tests in a specific testing center 1005a-c.

Once a signal distribution panel 1040a-c receives signals, engineers can test with a mobile device 2000 design with the signals. In some implementations, an engineer places a mobile device 2000 inside a case in the testing center 1000a-c. The mobile device 2000 can be a prototype or actual mobile device based on the mobile device designed received by the validation platform 1020. In some implementations, the engineer has a laptop that can be used to transmit feedback information (e.g., occurrence of an error, failure or success of a specific test) from inside the testing center to the validation platform 1020. Additionally, sensors inside the testing center or case can automatically transmit feedback to the validation platform (e.g., signal strength data, motion detection data).

In some embodiments, a engineer located in a testing center can request an additional testing signal from the validation platform 1020 using a graphical user interface displayed on the engineer's laptop. In response to receiving the request, the validation platform can send instructions to route the additional signal via the switch 1010 to the testing center 1005a-c. The signal distribution panel 1040a-c can receive and control the additional signal in the testing center. Also, the engineer located in the testing center can send validation results (e.g., data showing completion of all tests) to the validation platform 1020 using his or her laptop and a graphical user interface.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. At least one non-transitory computer-readable medium, carrying instructions, which when executed by at least one data processor, performs a method for validating a mobile device, the method comprising:
    receiving at a validation platform a mobile device design validation request from a design application,
        wherein the validation request includes technical details regarding a mobile device to be tested;
    in response to receiving the validation request, querying a signal generation device to determine testing signal availability;
    via the validation platform, routing testing signals from the signal generation device to a desired testing center selected from multiple testing centers;
    receiving, at the validation platform, feedback information from the desired testing center with respect to testing of the mobile device;
    receiving a request for an additional testing signal; and
    in response to receiving the request for the additional testing signal, sending instructions to route the additional testing signal to the desired testing center.

2. The computer-readable medium of claim 1, wherein the validation request includes details related to at least two of:
    an antenna model,
    a software version,
    at least one technical capability, or
    a request to validate the mobile device design for a specific signal,
        wherein the technical capabilities include web browsing, Voice over IP (VoIP) calling, Short Message Service (SMS) messaging, or Multimedia Message Service (MMS) messaging, and
        wherein the specific signal includes Long-Term Evolution-unlicensed (LLTE-U).

3. The computer-readable medium of claim 1, further comprising:
    receiving at the validation platform an acknowledgement of available signals from the signal generation device, wherein the signals include Universal Mobile Telecommunications System (UTMS), Global System Mobile (GSM) or Long-Term Evolution -unlicensed (LTE-U), and
    querying a database to determine availability of testing centers and locations of testing centers to receive testing signals.

4. The computer-readable medium of claim 1, wherein routing testing signals includes sending instructions to a switch, wherein the switch routes the testing signals to the desired testing center, and wherein a signal distribution panel at the desired testing center receives and controls the testing signals for application for the mobile device.

5. The computer-readable medium of claim 1, further comprising:
    via the validation platform, sending instructions to the desired testing center to grant access for at least one user to the desired testing center to thereby allow the user to perform validation tests at the desired testing center.

6. The computer-readable medium of claim 1, wherein the feedback information is from sensors at the desired testing center and includes signal strength data and motion detection data.

7. The computer-readable medium of claim 1, wherein receiving the request for the additional testing signal is received via a graphical user interface provided to a user.

8. The computer-readable medium of claim 1, wherein:
the feedback information includes an occurrence of an error, failure or success of a specific test from the desired testing center, and wherein a prototype mobile device is being validated with respect to the mobile device design validation request.

9. At least one non-transitory computer-readable medium, carrying instructions, which when executed by at least one data processor, provide instructions for a graphical user interface for validating a mobile device, comprising:
providing a list of multiple testing centers from which one or more desired testing centers are selectable,
wherein the one or more desired testing centers are for testing a mobile device according to a validation plan having a testing protocol;
receiving a selection of the one or more desired testing centers;
displaying signals distributed to the one or more desired testing centers, wherein a signal generation device sends the signals to the one or more desired testing centers; and
displaying a number of users or tests at the one or more desired testing center;
wherein one or more desired testing centers are configured to receive multiple testing signals based on execution of the testing protocol or based on signal requests from one of the users.

10. The computer-readable medium of claim 9, further comprising:
providing a request form, wherein the request form includes fields to be
completed for—
specific features of a desired signal for the validation plan,
a test schedule,
a lab location,
a time period or date, and
a specific geographic location.

11. The computer-readable medium of claim 9, wherein the validation plan comprises one or more series of tests, associated testing signals, associated testing centers necessary to complete a validation process according to the validation plan, set of steps and operations for testing functions of the mobile device, testing schedules, or any combination thereof.

12. The computer-readable medium of claim 9, wherein the validation plan is associated with one or more parameters, wherein the one or more parameters identify criteria or resources required to complete the validation plan, and wherein the one or more parameters relate to—
testing signal type,
equipment required for performing one or more tests in the validation plan,
location of the one or more tests in the validation plan,
number of users required to perform the one or more tests in the validation plan,
certifications,
number of tests required to validate the validation plan,
criteria requirement to validate the validation plan,
or any combination thereof.

13. The computer-readable medium of claim 9, wherein the validation plan is associated with one or more parameters, wherein the one or more parameters identify criteria or resources required to complete the validation plan.

14. The computer-readable medium of claim 9, further comprising:
receiving, from a user, at least one request for an additional signal for the desired testing center,
wherein in response to receiving the at least one request, the signal generation device sends at least one additional signal to the desired testing center.

15. A method for validating a mobile device, the method comprising:
providing a list of multiple testing centers from which one or more desired testing centers are selectable,
wherein the one or more desired testing centers are for testing a mobile device according to a validation plan having a testing protocol;
displaying signals distributed to the one or more desired testing centers,
wherein a signal generation device sends the signals to the one or more desired testing centers; and
displaying a number of users or tests at the one or more desired testing centers;
wherein the one or more desired testing centers are configured to receive multiple testing signals based on execution of the protocol or based on signal requests from one of the users.

16. The method of claim 15, further comprising:
providing a request form, wherein the request form includes fields to be
completed for—
specific features of a desired signal for the validation plan,
a test schedule,
a lab location,
a time period or date, and
a specific geographic location.

17. The method of claim 15, wherein the validation plan comprises one or more series of tests, associated testing signals, associated testing centers necessary to complete a validation process according to the validation plan, set of steps and operations for testing functions of the mobile device, testing schedules, or any combination thereof.

18. The method of claim 15, wherein the validation plan is associated with one or more parameters, wherein the one or more parameters identify criteria or resources required to complete the validation plan.

19. The method of claim 18, wherein the one or more parameters relate to—
testing signal type,
equipment required for performing one or more tests in the validation plan,
location of the one or more tests in the validation plan,
number of users required to perform the one or more tests in the validation plan,
certifications,
number of tests required to validate the validation plan,
criteria requirement to validate the validation plan,
or any combination thereof.

20. The method of claim 15, further comprising:
receiving, from a user, at least one request for additional signal to the desired testing center,
wherein in response to receiving the at least one request, the signal generation device sends at least one additional signal to the desired testing center.

* * * * *